UNITED STATES PATENT OFFICE 2,619,428

PROCESS FOR MODIFYING STARCH WITH ALUMINUM CHLORIDE AND ENZYME AND APPLICATIONS OF SUCH MODIFIED STARCH

Ralph W. Kerr, Riverside, Ill., assignor to Corn Products Refining Company, New York, N. Y., a corporation of New Jersey No Drawing. Application March 1, 1950, Serial No. 147,136

40 Claims. (Cl. 106—214)

This invention relates to the manufacture of starch conversion products such as thin boiling starches, dextrins, gums, and sirups.

An object of this invention is to provide an improved process for the manufacture of such products. A further object of the invention is to provide such products having improved characteristics. Other objects and advantages will appear hereinafter.

Heretofore thin boiling starches, dextrins and the like have been made by long and complicated procedures. The most common procedures for making thin boiling starches involve heating an acidified starch slurry at temperatures of about 125° F. for periods of 8 to 24 hours. Thereafter, the slurry is neutralized and filtered. The treated starch is then washed and dried. In some cases, if starch having a rather high fluidity value is desired, the starch slurry may be filtered without being neutralized and the moist cake may be dried and heated in a warm kiln for several days.

The common methods for the preparation of pyrodextrins, gums and the like involve roasting starches of low moisture content in the presence of atomized acid. The temperatures may be as high as 450° F. and the periods of heating as long as 24 hours. Precautions must generally be taken to avoid producing dark colored dextrins.

Methods are also known for manufacturing starch conversion products of varying degrees of degradation by the use of enzyme acting upon untreated starch or starch modified previously by other means. The starch to be treated by enzymes is usually slurried in a large volume of water so that the solids concentration will be relatively low in order that the viscosity of the slurry will not become so great as to result in an unworkable mass. Such processes are disadvantageous in many cases, for example, in the production of sirups, where a large volume of the water present must subsequently be evaporated. In other cases such as the clay coating of paper by machine methods, they are entirely unsuitable, since this method requires a coating composition of high density. Although, the use of enzymic conversion of starch has become an established practice in low density coating work, an extension of this practice into the field of high density coatings has met with serious difficulties and many of the problems involved have remained unsolved. The chief difficulty arises from the fact that in order to obtain a coating composition of the desired solids content, a limited quantity of water is available and in ordinary methods of procedure this is insufficient to convert the starch into a form which possesses a low solution viscosity, but relatively high adhesive strength.

I have now discovered a novel method of producing thin boiling starches, dextrins, gums, sirups and the like having improved properties, which method obviates the difficulties of prior processes. The process of my invention is simple and requires comparatively little time.

In general the process of my invention embraces treating starch with small amounts of aluminum chloride hexahydrate under controlled conditions of moisture and temperature, followed by enzymic conversion of the starch thus treated. The term aluminum chloride as used hereinafter is intended to mean aluminum chloride hexahydrate.

I am aware that it has been proposed heretofore to use aluminum chloride as a starch modifying agent and that more generally it has been proposed to use as starch modifying agents those metallic salts which are adapted to decompose with the resultant formation of free acid. Patents directed to the use of such materials are as follows: United States Patent No. 536,260, issued March 26, 1895, to Bloede; United States Patent No. 610,182, issued September 6, 1898, to Higgins; and United States Patent No. 1,284,495, issued November 12, 1918, to Tunnell. I am further aware that it has also been proposed heretofore to convert starch by means of enzymes. However, as will appear more fully from the following description, the present invention contemplates marked and substantial departures from practices heretofore known.

In carrying out my invention aluminum chloride is first added to starch. This addition may be effected in several ways. The simplest and most effective method is to add aluminum chloride to a starch slurry at room temperature, or, in any event, at a temperature preferably insufficient to effect gelatinization of the starch, stir the slurry well and then filter the same. If aluminum chloride is added to a starch slurry having a density between 17° Bé and 22° Bé which range has been found to cover practical operating conditions, the amount of such salt retained by the starch after filtration is about 50 percent of the aluminum chloride originally added. The filtrate, obtained from one such filtering operation, with appropriate additions of aluminum chloride to compensate for the amount retained by the filtered starch may be used advantageously for starch to be treated subsequently.

Another method of adding aluminum chloride to starch is simply to add aluminum chloride in dry form to dry starch and thereafter to mix thoroughly the two materials. A third method is to dissolve aluminum chloride in an alcoholic solution, add the solution to dry starch with thorough mixing, and then remove the alcohol. In fact any desired method may be used for admixing aluminum chloride with starch which tends to insure that the aluminum chloride will be evenly distributed throughout the starch.

The second step of carrying out the present invention involves heating the starch to which aluminum chloride has been added. This may be effected in several ways. The simplest method is to carry out the desired modification of the starch in a commercial type of air dried through which heated air is circulated. Alternatively the starch may be treated in such a drier to effect partial modification thereof and the balance of the treatment may be carried out by roasting at a higher temperature in a dextrin cooker or the like. A third method of heat treating starch in the presence of aluminum chloride is to pass a slurry of starch containing aluminum chloride over heated rolls in the manner generally disclosed in United States Patent No. 1,979,257, issued November 6, 1934. Alternatively, the slurry may be filtered on a mechanical filter and the filter cake passed over such rolls.

When a slurry of starch admixed with aluminum chloride in amounts hereinafter specified is heated above the gelatinization temperature of the starch, it is observed that the starch is gelatinized but is not noticeably modified by the aluminum chloride present. Accordingly this method of heating is ineffective for purposes of the present invention which apparently requires that the starch be heated with aluminum chloride in the absence of undue amounts of free water.

On the other hand, as above indicated, slurries containing starch and aluminum chloride can be utilized in practicing the present invention if such slurries are passed over heated rolls or the like which permit rapid drying of the starch as well as the heating of the latter in the presence of aluminum chloride. It is believed that the driving off of excess moisture is a necessary preliminary to the desired modification of the starch under treatment on the rolls.

Other methods of heat treating starch in the presence of aluminum chloride include combinations of these various methods previously indicated. In fact, any means of heating may be used provided conditions are controlled as will be specified hereinafter.

After the heat treatment is completed, it is generally desirable to adjust the pH value of the starch to about 5.5 to 7.5 or a value suitable for optimum activity of the particular enzyme preparation to be used in the second phase of the process, preferably with gaseous ammonia, although other alkaline agents may be used.

One of the principal and distinguishing features of my process for converting starch described herein is that the starch is conditioned during the first phase (aluminum chloride treatment) so that its ability to hydrate during the hydrolysis or enzyme conversion phase is very materially reduced without detracting from the desirable properties of the starch such as its adhesive strength, body or viscosity or its ability to be converted by enzymes to sirups of high fermentable content. As a consequence of the aluminum chloride treatment a relatively small proportion of water is required to disperse the starch and maintain it in a fluid condition.

The starch subjected to the aluminum chloride treatment is slurried in a relatively small amount of water and treated with an enzyme at a pH appropriate for the particular enzyme preparation used. Adjuncts or other substances may be added to the starch slurry prior to or during the conversion process; for example calcium salts to stabilize the enzyme to heat, or the clay and deflocculating agents required in the final paper coating.

The use of aluminum chloride and enzymes in treating starches in accordance with my invention may be extended to produce practically all of the common types of modified starches, including thin boiling starches, gums, dextrins, pre-gelatinized cold water soluble starches, drum dried dextrins and sirups but having the improved properties heretofore mentioned. To produce products of these various types, however, the conditions employed in carrying out the process of the invention will vary, as will appear more fully hereinafter.

In obtaining products of these various types, the conditions under which the desired modification and also the extent of the modification of starch with aluminum chloride is effected in accordance with the present invention depend upon several factors or variables. These factors are more or less interrelated. They are (1) the amount of aluminum chloride, (2) the pH value of starch undergoing treatment, (3) moisture content of starch during treatment, (4) temperature of the starch during treatment, and (5) time of treatment.

The conditions under which the subsequent conversion with enzymes and also the extent to which conversion is effected depend upon several factors, more or less interrelated. These are (1) the particular enzyme preparation employed, (2) the amount of enzyme used, (3) the pH value of the starch undergoing conversion, (4) the temperature of the conversion, (5) time of treatment, and (6) to some degree the variety of starch used.

The amount of aluminum chloride which is necessary to produce the desired effect upon starch in practicing my invention is very small, i. e., of the order of about 0.05 percent, based upon the dry weight of the starch. Amounts of the salt larger than this may also be used but the amount should not exceed about 0.4 to about 0.5 percent of aluminum chloride, based upon the dry weight of the starch. Within the indicated limits, the greater the amount of aluminum chloride, the greater will be the extent of the modification of starch, other factors being constant. If amounts of aluminum chloride larger than about 0.5 percent are used, there will be difficulty in controlling the reaction and also in obtaining the desired products.

The pH value of starch, as that term is hereinafter defined, to be treated in accordance with the present invention, should be within the range of about 2.8 to about 3.4 and preferably within the range of about 3.0 to about 3.4. In view of the property of aluminum chloride to form aluminum hydroxide and an aluminate with alkaline solutions, it is preferable not to use water, for slurrying the starch, having a pH value higher than 7.0. However, should the pH value of the starch in water slurry be higher than 3.4, adjustment of the pH value may be made by adding to the starch slurry a suitable acid, such as hydrochloric acid. If the starch supplied for use in carrying out the invention contains abnormally high amounts of sulfur dioxide (or other similar volatile acids), then a pH value of the starch slurry in the range of about 2.8 to 3.0 is quite permissible since the sulfur dioxide will be volatilized during subsequent heat treatment. Should the pH value be too low, it may be adjusted with a suitable alkaline agent, such as ammonium hydroxide, sodium carbonate and the like. For practical operations, so called condensate water from evaporators, boilers, etc., is satisfactory for preliminarily washing the starch and for slurrying starch to produce admixtures of starch and aluminum chloride as hereinabove described.

The moisture content of starch which is to be treated in accordance with the present invention, i. e., the amount of moisture present with the starch, may vary over a wide range but, in any case, will depend upon the temperature employed during the heat treatment and upon the type of product desired. The effect of aluminum chloride on starch is greatest when small amounts of moisture are present with the starch and least when large amounts of moisture are present with the starch, other factors being constant. Therefore, it is advantageous to provide for the removal of moisture during the heat treatment and/or to use starch having a rather low initial moisture content.

In some instances, as in the production of thin boiling starches, dextrins or the like from starch in accordance with the present invention, gelatinization is to be avoided and in such cases the moisture content of the starch undergoing treatment should be predetermined, so that at any given temperature employed during the modification treatment there is insufficient moisture present to permit gelatinization to any appreciable degree. If predetermination of the moisture content of the starch is not feasible or desired, comparable results may be obtained through careful control of the temperature which should not exceed that at which gelatinization occurs until, as through heating, the moisture content of the starch is reduced sufficiently so that gelatinization will not occur if the temperature should be raised above the gelatinization temperature of the starch.

Whether the temperatures employed in effecting the modifications of the present invention are above or below the gelatinization temperature, and whether the starch to be modified is gelatinized or ungelatinized, the desired modification of starch in the presence of aluminum chloride proceeds more effectively in the presence of relatively small amounts of moisture than in the presence of relatively large amounts of moisture. The moisture content of starch undergoing modification in accordance with the invention should generally be within the range of about 1 to 2 percent to about 30 percent, and preferably within the range of about 1 to 2 percent to about 20 percent, based upon the total weight of the starch and moisture. It is to be understood, however, that starch initially containing, or in the presence of, larger amounts of moisture than above specified may be heated with aluminum chloride with a view to obtaining the products contemplated by the present invention, but that the starch modification with which the present invention is concerned will not become manifest unless and until excess moisture has been removed, as by its evaporation upon heating of the material undergoing treatment.

In the production of thin boiling starches where gelatinization of the starch is to be avoided during the heat treatment, the initial moisture content of the starch subjected to treatment may vary from about 20 to about 45 percent if the temperature does not exceed about 70° C. When the temperature exceeds about 70° C., the moisture content of the starch should be reduced below about 20 percent. A moisture value of about 9 to 12 percent is a practical operating value for making thin boiling starches in accordance with the present invention, when the temperature of the starch is of the order of about 75° C. to about 95° C.

In making dextrins, where again gelatinization is to be avoided, somewhat lower moisture contents than those above specified are preferable, although the same considerations as to moisture content and temperature apply. A moisture value of about 5 to 7 percent is a practical operating value for making dextrins in accordance with the present invention, when the temperature of the starch is of the order of about 90° C. to about 105° C.

In making gelatinized starch products according to the present invention by means of heated rolls, higher moisture values, i. e., about 45 percent to about 60 percent or even higher are generally satisfactory since the moisture content is immediately reduced by the heat of the rolls.

The temperature of the starch during the treatment thereof with aluminum chloride may vary from about 20° C. to about 105° C. provided the moisture values are controlled as above indicated. The reaction at room temperature, however, proceeds extremely slowly and is not practicable. At temperatures above 105° C. it is difficult to prevent charring of the starch and to control the reaction.

The time of the heat treatment required to obtain the desired products will depend upon the amount of aluminum chloride, the moisture content of the starch and the temperature of the starch undergoing treatment. The larger the amount of aluminum chloride, the lower the moisture content of the starch, and the higher the temperature of the starch during treatment, the shorter will be the time required for the treatment. The shortest period of time is a matter of a few seconds when the starch is subjected to treatment over rolls. Thin boiling starches and dextrins may be prepared within about 30 to 45 minutes. Ordinarily the time of treatment does not exceed about 2 to 3 hours.

Due to the large number of combinations of concentration of aluminum chloride, moisture content, temperature and time factors possible under the present invention and the wide variety of products which it is possible to produce in accordance therewith, it is not feasible to attempt to set forth the exact operating conditions for each product possible of production. Below are presented some tables which will show the effect of each of these factors, the other factors being constant. Persons skilled in the art will have no difficulty in determining through suitable preliminary tests which particular conditions of treatment are best suited to obtain the products they desire.

The amount of enzyme which is necessary to produce the desired degree of conversion in the second phase of the process depends upon the potency of the particular enzyme preparation employed as well as upon time, temperature and pH conditions, i. e., under a given set of conditions different amounts of different enzyme preparations will be required to attain a comparable degree of conversion, and on the other hand a given amount of a specific enzyme preparation will result in varying degrees of conversion depending upon variations in time, temperature and pH. For reasons of economy, it is desirable to use the least possible amount of enzyme to achieve the desired degree of conversion within a reasonable length of time. In general, less enzyme of a given type is necessary in my new process than in previously known processes of enzyme conversion to accomplish the desired degradation in a comparable period of time.

The exact pH value of the starch slurry to be treated in accordance with the second phase of my invention, i. e. the enzyme conversion, and the temperature of conversion principally depend upon the particular enzyme preparation employed, in addition to the other interrelated factors mentioned above. Data on pH values and temperatures necessary for optimum activity of commercial enzyme preparations are usually supplied by the manufacturer. However, pH values within the range of about 5.5 to about 7.5 will usually be found satisfactory.

The temperature employed also depends on whether or not gelatinization of the starch is permissible or desirable. Thus, in the production of sirups and cold water dispersible starches, temperatures within the range of gelatinization temperature are generally suitable, although it must be borne in mind that enzymes are inactivated by excessive temperatures, so that the manufacturer's recommendations regarding temperature conditions for use of a particular enzyme preparation should be followed.

The solids concentration of the starch slurry in the enzyme conversion phase is not critical. However, an outstanding advantage of my new process is that the enzyme conversion may be carried out at relatively high solids concentrations, as compared with prior practice of converting at low solids. This is due to the fact that the aluminum chloride treatment of the starch initially reduces its capacity for hydration and thus enables the further processing at high solids concentration without having to contend with the tremendous viscosities encountered under like conditions heretofore. Solids concentrations as high as about 40% to about 70% may be advantageously employed in the practice of this invention, although higher or lower concentration may also be used.

In that portion of the description which follows reference will be had to several definitive expressions, analytical methods and the like. The explanation which follows at this point is intended to render clear the meaning of such expressions and methods.

*pH value of starch.*—In describing and claiming the present invention this expression has reference to admixtures of starch and aluminum chloride. The value is determined as follows:

An admixture of starch and aluminum chloride under test is slurried in distilled water to form a slurry having a density of 10° Bé. at 60° F. This slurry is shaken for 30 minutes and then centrifuged. The pH value for the separated liquor is then measured in conventional manner.

In the case of comparative Tables VII, VIII and IX where hydrochloric acid is used, however, the expression pH value of starch refers to the determination made by the described procedure except that hydrochloric acid is substituted for aluminum chloride.

*Solution viscosity test.*—Into 20 or 30 milliliters of 2 normal potassium hydroxide in a 100 ml. beaker is stirred 0.2500 gram of starch (dry substance). The mixture is stirred for several minutes and is then allowed to stand overnight at room temperature. Then the solution is transferred quantitatively to a 50 ml. volumetric flask and the solution is made up to 50 ml. volume with 2 N potassium hydroxide.

The solution is transferred to an Ostwald viscometer (capacity about 6 ml.), filling the latter to the lower mark. The viscometer is placed in a water bath having a temperature of 25° C.±0.05°. After about 15 minutes, suction is applied in order to draw the solution up to the higher mark. The number of seconds is then noted for the meniscus to reach the lower mark on the viscometer.

A similar viscosity determination is made on the 2 N potassium hydroxide which is used as the solvent for the starch.

The specific viscosity at a concentration of 0.5 g. per 100 cc. ($\eta$ sp.) is calculated as follows:

$$\eta sp = \frac{\text{Viscosity of solution in seconds} - \text{Viscosity of solvent}}{\text{Viscosity of solvent}}$$

Specific viscosities determined by means of the above formula and method will be found to vary for different samples of material under test in much the same way as do the more conventional determinations of fluidity, and Scott or hot paste viscosity. The specific viscosity is in fact a linear function of the conventional fluidity values. For thin boiling starches prepared in accordance with the present invention, the following results were obtained and correlated against the Scott test (for hot paste viscosity) and fluidity. The sample was prepared according to the procedure outlined in Example I which will be described hereinafter.

| Fluidity | 28.35 g. Scott test | $\eta$ sp.(Conc.= 0.5 g./100 cc.) |
|---|---|---|
| 16 | 124 | 0.698 |
| 40 | 55 | .520 |
| 50 | 41 | .411 |
| 60 | 36 | .37 |

*Soluble material.*—The percentage of soluble material in starch is determined as follows:

A one gram sample of the material is made up to 100 ml. with water. The mixture is then shaken for 1 hour at room temperature and filtered. A 50 ml. aliquot of the filtrate containing the dissolved material is evaporated to dryness on a steam bath and finally dried in a vacuum oven at 105° C. for 4 hours, and the residue weighed. The percentage of soluble material $$= \frac{\text{weight of residue} \times 2}{\text{weight of sample}} \times 100$$

*Ferricyanide number.*—This is an index to the reducing value of sugars and the like and is determined as set out below following the method as described by Gore and Steele, Ind. Eng. Chem., Anal. Ed., 7, 324 (1935).

Two hundred and fifty milligrams of starch is dissolved in 25 ml. of boiling water and heated in a boiling water bath for 2 minutes. 25 ml. of alkaline ferricyanide reagent is added and the mixture held in the boiling water bath for an additional 15 minutes. It is then cooled quickly to 25° C., whereupon 60 ml. of zinc sulfate-acetic acid reagent and 20 ml. of 20% potassium iodide solution are added. The liberated iodine is titrated with 0.05 normal thiosulfate. The ferricyanide number is expressed as the ml. of 0.1 normal ferricyanide consumed per gram of material (dry substance basis).

*Linear polymers determination.*—The percentage of linear polymer components in starch is determined spectrophotometrically with iodine-stained solutions according to the method of Kerr and Trubell, Paper Trade Journal, 117, No. 15, 25 (1943).

*Fluidity value.*—This is determined in accordance with the method described in "Chemistry and Industry of Starch," Kerr (1944), page 95.

*Stormer test.*—This is determined in accordance with the procedure described in "Chemistry and Industry of Starch," supra, page 88.

*Gel strength.*—This is determined in accordance with the Saare disc method described in "Chemistry and Industry of Starch," supra, page 97.

*Scott test.*—This test is carried out in accordance with the procedure described in "Chemistry and Industry of Starch," supra, pages 85 to 87.

In each of the following tables which demonstrate the effect of the factors referred to above, the moisture content of the starch before treatment with aluminum chloride was adjusted without resort to heat. In the cases of the 20 percent, 15 percent, and 10 percent moisture values, the moisture content of the starch was adjusted by air drying same at room temperature. In the case of the 5 percent moisture value, the adjustment was made by drying the starch over sulfuric acid. In each instance the starch undergoing treatment was raw corn starch. The aluminum chloride was added by the slurry method previously described. Where pH values are given these were determined as of the slurry before filtering and drying the starch. The moisture content of the starch was maintained throughout the treatment substantially at the values indicated in the tables.

Table I demonstrates the influence of moisture content upon the rate of modification of starch with aluminum chloride at several time intervals. The heat treatment was effected in an oven at a temperature of 100° C. The amount of aluminum chloride used was 0.1 percent, based upon the dry weight of the starch. The results are expressed in terms of solution viscosity.

TABLE I

[0.1% of $AlCl_3.6H_2O$; pH value=3.2; 100° C.]

| Time, minute | 5% moisture, $\eta$ sp.×10 | 10% moisture, $\eta$ sp.×10 | 15% moisture, $\eta$ sp.×10 | 20% moisture, $\eta$ sp.×10 |
|---|---|---|---|---|
| 0 | 5.52 | 14.33 | 14.28 | 16.05 |
| 30 | 4.75 | 13.30 | 14.41 | 15.68 |
| 60 | 3.20 | 11.12 | 14.91 | 15.55 |
| 180 | .83 | 3.56 | 9.02 | 9.91 |
| 300 | .44 | 2.15 | 5.50 | 3.97 |
| 1,440 | .19 | .44 | .46 | .55 |

Table II also demonstrates the effect of moisture content on starch treated with aluminum chloride for varying periods of time. The amount of aluminum chloride used was 0.1 percent based upon the dry weight of the starch and the temperature of the oven used to effect the treatment was 100° C. The results are expressed in terms of the percent of soluble material formed.

TABLE II

[0.1% of $AlCl_3.6H_2O$; pH value=3.2; 100° C.]

| Time, minutes | 5% Moisture, percent soluble | 10% Moisture, percent soluble | 15% Moisture, percent soluble | 20% Moisture, percent soluble |
|---|---|---|---|---|
| 0 | 0.25 | 0.22 | 0.47 | 0.25 |
| 30 | .42 | .31 | .45 | .22 |
| 60 | .85 | .31 | .40 | .20 |
| 180 | 12.99 | 1.18 | .47 | .24 |
| 300 | 51.65 | 2.06 | .51 | .51 |
| 1,440 | 100.2 | 45.41 | 28.17 | 21.65 |

Table III compares the amount of soluble material formed at different levels of solution viscosity when starch is modified with aluminum chloride. The amount of aluminum chloride used was 0.1 percent based upon the dry weight of the starch and the temperature of the oven in which treatment was effected was 100° C.

TABLE III

[0.1% of $AlCl_3.6H_2O$; pH value=3.2; 100° C.]

| 5% Moisture | | 10% Moisture | | 15% Moisture | | 20% Moisture | |
|---|---|---|---|---|---|---|---|
| $\eta$ sp.×10 | Percent soluble | $\eta$ sp.×10 | Percent soluble | $\eta$ sp.×10 | Percent soluble | $\eta$ sp.×10 | Percent soluble |
| 5.96 | 0.42 | 14.33 | 0.22 | 14.28 | 0.47 | 16.05 | 0.25 |
| 4.20 | .80 | 13.30 | .31 | 14.41 | .45 | 15.68 | .22 |
| 2.10 | 1.90 | 11.12 | .31 | 14.91 | .40 | 15.55 | .20 |
| 1.18 | 5.40 | 3.56 | 1.18 | 9.02 | .47 | 9.91 | .24 |
| .86 | 20.8 | 2.15 | 2.06 | 5.50 | .51 | 3.97 | .51 |
| .58 | 48.4 | .44 | 45.41 | .46 | 28.17 | .55 | 21.65 |
| .42 | 79.1 | ---- | ---- | ---- | ---- | ---- | ---- |
| .35 | 90.0 | ---- | ---- | ---- | ---- | ---- | ---- |
| .30 | 91.9 | ---- | ---- | ---- | ---- | ---- | ---- |

Table IV demonstrates the effect of temperature on the rate of modification of starch containing 5 percent moisture when modified with 0.1 percent of aluminum chloride based upon the dry weight of the starch. The heat treatment was effected in an oven at 100° C., 75° C., and 50° C. The results are expressed in terms of solution viscosity.

TABLE IV

[5% moisture; 0.1% of $AlCl_3.6H_2O$; pH value=3.2]

| Time, minutes | 100° C., $\eta$sp×10 | 75° C., $\eta$sp×10 | 50° C., $\eta$sp×10 |
|---|---|---|---|
| 0 | 5.52 | 5.52 | 5.52 |
| 30 | 4.75 | 5.52 | 5.81 |
| 60 | 3.20 | 5.27 | 5.70 |
| 180 | .83 | 2.49 | ---- |
| 300 | .44 | 1.01 | 4.60 |
| 1,440 | .19 | .73 | 3.10 |
| 2,880 | ---- | ---- | 2.49 |

Table V demonstrates the effect at 100° C. (oven temperature) of different amounts of aluminum chloride on starch having a moisture content of 5 percent for varying intervals of time. The amounts of aluminum chloride used were 0.1 percent and 0.2 percent, each based upon the dry weight of the starch. The results are expressed in terms of percentage of soluble material, reducing value expressed as ferricyanide number, the percentage of linear material and solution viscosity.

TABLE V

[0.1% $AlCl_3.6H_2O$; pH value=3.45; 100° C.; 5% moisture]

| Time, minutes | Percent soluble | Ferri-cyanide No. | Percent linear | $\eta sp \times 10$ |
|---|---|---|---|---|
| 0 | 0.42 | 1.7 | 21.5 | 5.96 |
| 15 | .80 | 2.6 | 21.5 | 4.02 |
| 30 | 1.90 | 4.3 | 20.0 | 2.10 |
| 45 | 5.4 | 7.7 | 15.8 | 1.18 |
| 60 | 20.8 | 14.6 | 9.5 | .86 |
| 90 | 48.4 | 21.2 | 5.8 | .58 |
| 120 | 79.1 | 26.7 | 4.5 | .42 |
| 180 | 92.4 | 31.5 | 1.8 | |
| 240 | 90.0 | 31.4 | 1.5 | .35 |
| 300 | 91.9 | 29.7 | 1.0 | .30 |

[0.2% $AlCl_3.6H_2O$; pH value=3.45; 100° C.; 5% moisture]

| Time, minutes | Percent soluble | Ferri-cyanide No. | Percent linear | $\eta sp \times 10$ |
|---|---|---|---|---|
| 0 | 0.49 | 0.99 | 22.5 | 7.17 |
| 15 | 1.53 | 2.84 | 17.5 | 2.37 |
| 30 | 5.33 | 6.78 | 14.5 | 1.17 |
| 45 | 12.6 | 11.10 | 8.8 | .54 |
| 60 | 21.3 | 14.59 | 6.0 | .45 |
| 90 | 43.2 | 21.05 | 3.3 | .26 |
| 120 | 69.0 | 27.10 | 2.0 | .20 |
| 180 | 96.5 | 35.00 | 1.5 | .10 |
| 240 | 100 | 36.59 | 1.3 | .05 |
| 300 | 100 | 35.14 | 1.0 | .11 |

Table VI demonstrates the effect of several methods of adding aluminum chloride to starch to be treated in the presence thereof. Aluminum chloride was added to starch by the slurry method, by blending with dry starch and in alcoholic solution. In each case the amount of aluminum chloride present with the starch during heat treatment was 0.1 percent, based upon the dry weight of the starch. The moisture content was 5 percent and the temperature of the oven in which treatment was effected was 100° C. The results are expressed in terms of solution viscosity.

TABLE VI

[5% moisture; 0.1% of $AlCl_3.6H_2O$; 100° C.]

| Time, minutes | Slurry method, $\eta$ sp. $\times$ 10 | Dry blend, $\eta$ sp. $\times$ 10 | Alcoholic solution blend, $\eta$ sp. $\times$ 10 |
|---|---|---|---|
| 0 | 5.96 | | 7.14 |
| 15 | 4.02 | 9.60 | 2.06 |
| 30 | 2.10 | .99 | .63 |
| 45 | 1.18 | .58 | .41 |
| 60 | .86 | .31 | .39 |
| 90 | .58 | .28 | .32 |
| 120 | .42 | .26 | |
| 180 | | .25 | .29 |
| 240 | .35 | .25 | |

Most natural starches are now considered to be mixtures of two parts of polymers; one is essentially linear in molecular configuration and is generally referred to as amylose; and the other, the major portion, is highly branched in molecular configuration and is generally referred to as amylopectin. The linear chain polymers impart to starch pastes their gel forming properties while the branched chain polymers impart to starch pastes their protective colloidal and adhesive characteristics.

Hydrolysis of starch tends to break down both components of the starch in random fashion to produce fragments of lower molecular weight with consequent increase in the reducing value of the hydrolysate. Also as hydrolysis of starch proceeds an increase in solubility and a decrease in viscosity are noted. The end product of hydrolysis of starch is dextrose while at various intermediate stages of hydrolysis, particularly in the early stages, dextrins of high molecular weight are formed. These dextrins, because of their linear character, are believed to be at least in part responsible for the increase in the viscosity of pastes made from acid hydrolyzed starches observed upon their being allowed to stand.

Condensation, on the other hand, as the term is herein employed is intended to refer to a phenomenon which is the opposite of hydrolysis as above described, but is intended to relate to chemical changes occurring in respect to the products of the initial phases of hydrolysis of starch. Aluminum chloride being acidic in character catalyzes the hydrolyis of starch but under the conditions essential to the practice of the present invention condensation effects are materially enhanced over those observed as an incident to the conventional hydrolysis of starch as catalyzed, for example, by hydrochloric acid.

Condensation involves the elimination of water by the formation of glycosidic linkages either inter or intra molecular. In the case of the formation of inter molecular glycosidic linkages, the relatively molecular weight of the resulting condensates is increased. In the case of the formation of intra molecular linkages, the molecular weight is not increased but the shape factors of the resulting molecules are so changed that some of the characteristics associated with linearity are eliminated and those characteristics associated with the branched chain component correspondingly enhanced. The latter effect may be noted also in the case of the formation of inter molecular glycosidic linkages in those instances in which condensation results in the formation of branched chain molecules, thus again enhancing the characteristics associated with the branched chain component of starch. The net effect of condensation is to increase the characteristics associated with the non-linear components of starch. Condensation brings about a decrease in reducing value and an increase in water solubility. The soluble material formed upon condensation is of a different character than that formed upon hydrolysis of starch. The soluble material formed upon condensation appears to be composed of branched chain polymers formed from condensation of the linear polymers. Pastes made from the products of condensation are stable on standing and do not form insoluble gels and have a relatively high viscosity as compared to starches which have been hydrolyzed or modified with hydrochloric acid.

The modification of starch in accordance with the present invention is characterized by the relatively great extent to which condensation occurs and by the relatively great extent to which the effects of condensation characterize the resultant products as compared with processes and products involving essentially conventional hydrolysis.

The tables which follow compare various properties of starches modified with aluminum chloride and starches modified with hydrochloric acid, a typical acid.

Table VII compares the effect of modifying starch with 0.1 percent of aluminum chloride, based upon the dry weight of the starch; hydrochloric acid at a hydrogen ion concentration equivalent to that obtained with the aluminum chloride; and hydrochloric acid at a chloride concentration equivalent to that obtained with the aluminum chloride. In the first instance the pH value was 3.45, in the second, 3.45 and in the third, 1.9. The moisture content of the starch was 5 percent and the temperature of the oven wherein the treatment was effected was 100° C. The results are expressed in terms of solution viscosity.

TABLE VII

[5% moisture; 100° C.]

| Time, minutes | 0.1% AlCl₃.6H₂O pH value=3.45, ηsp.×10 | HCl at equiv. H ion concn. pH value=3.45, ηsp.×10 | HCl at equiv. chloride ion concn. pH value=1.9, ηsp.×10 |
|---|---|---|---|
| 0 | 5.96 | 15.6 | 2.70 |
| 15 | 4.02 | 16.0 | 1.68 |
| 30 | 2.10 | 15.7 | .66 |
| 45 | 1.18 | 14.9 | .44 |
| 60 | .86 | 14.5 | .36 |
| 90 | .58 | 14.6 | .27 |
| 120 | .42 | 14.4 | .29 |
| 180 | | 11.8 | .29 |
| 240 | .35 | 11.0 | .27 |

Table VIII compares the effect on starch of aluminum chloride and hydrochloric acid at an equivalent chloride ion concentration at two moisture values, 5 percent and 20 percent. The amount of aluminum chloride used was 0.1 percent based upon the dry weight of the starch; the pH value was 3.2. The pH value in the case of the hydrochloric acid and starch containing 5 percent of moisture was 1.9; for hydrochloric acid and starch containing 20 percent of moisture it was 2.5. The temperature of the oven in which the treatment was effected was 100° C. The results are expressed in terms of soluble material and ferricyanide number.

TABLE VIII

[AlCl₃.6H₂O: pH value=3.2; 100° C.]

| 5% Moisture | | 20% Moisture | |
|---|---|---|---|
| Percent solubles | Ferricyanide No. | Percent solubles | Ferricyanide No. |
| 0.25 | 1.28 | 0.25 | 1.10 |
| 0.42 | 1.67 | 0.22 | 0.85 |
| 0.85 | 2.63 | 0.20 | 0.85 |
| 12.99 | 11.49 | 0.24 | 0.86 |
| 51.65 | 21.22 | 0.51 | 1.76 |
| 100.2 | 39.56 | 21.65 | 26.18 |

[HCl; 100° C.]

| pH Value=1.9, 5% Moisture | | pH Value=2.5, 20% Moisture | |
|---|---|---|---|
| Percent solubles | Ferricyanide No. | Percent solubles | Ferricyanide No. |
| 2.19 | 3.5 | 0.28 | 1.36 |
| 3.76 | 5.2 | 0.31 | 1.52 |
| 18.9 | 14.3 | 0.28 | 1.64 |
| 64.7 | 25.5 | 3.49 | 7.29 |
| 85.4 | 32.2 | 9.71 | 17.70 |
| 92.9 | 37.7 | 52.89 | 81.46 |
| 94.6 | 40.5 | | |

Table IX compares the amount of linear polymers and the reducing values of starches treated with 0.1 percent of aluminum chloride (dry basis) and hydrochloric acid at a chloride ion concentration equivalent to that obtained with the aluminum chloride. In the former case the pH value was 3.45 while in the latter it was 1.9. The moisture content of the starch was 5%. The temperature of the oven in which treatment was carried out was 100° C. The time in minutes is also given.

TABLE IX

[5% moisture; 100° C.]

| Time, minutes | AlCl₃.6H₂O—pH value=3.45 | | HCl—pH value=1.9 | |
|---|---|---|---|---|
| | Percent linear polymers | Ferricyanide No. | Percent linear polymers | Ferricyanide No. |
| 0 | 21.5 | 1.7 | 21 | 3.5 |
| 15 | 21.5 | 2.6 | 20 | 5.2 |
| 30 | 20.0 | 4.3 | 10.5 | 14.3 |
| 45 | 15.75 | 7.7 | 5.0 | 25.5 |
| 60 | 9.5 | 14.6 | 2.25 | 32.2 |
| 90 | 5.75 | 21.2 | 2.00 | 37.7 |
| 120 | 4.5 | 26.7 | 1.75 | 40.5 |
| 180 | 1.75 | 31.5 | .5 | 38.5 |
| 240 | 1.50 | 31.4 | .0 | 38.5 |
| 300 | 1.0 | 29.7 | | |

Table X compares fluidity values, Stormer values of cold pastes, and gel strength of cold pastes made from corn starch modified in the presence of aluminum chloride and a commercial corn starch modified with acid to comparable fluidity levels.

TABLE X

| | Fluidity | Stormer values | Gel strength |
|---|---|---|---|
| Starch, modified with AlCl₃ | 70 | 6.0 | 9.5 |
| | 65 | 6.4 | 18.0 |
| | 40 | 12.0 | 190.0 |
| | 23 | 13.8 | 245.0 |
| Starch modified with acid | 75 | 7.0 | 244.0 |
| | 40 | 39.0 | 350.0 |
| | 20 | 134.0 | 417.0 |

It will be noted from the above tables that starches treated in accordance with the present invention differ considerably in properties from acid modified starches. Thus for a given viscosity and for a given solubility value, the reducing value of starch modified in the presence of aluminum chloride is considerably less than for an acid modified starch. For a given viscosity, the content of water soluble material is higher for starch modified with aluminum chloride than for starch modified with hydrochloric acid. Pastes made from starch modified with aluminum chloride have much less tendency to increase in viscosity on aging or to become insoluble on aging than do pastes made from raw or acid modified starches. Furthermore, the gel strength of pastes made from starch treated in accordance with the present invention are much less than that of paste made from other modified starches having comparable hot paste viscosities.

Starches modified with aluminum chloride have superior protective colloidal properties as compared to acid modified starches. Consequently, the former are extremely valuable in applications depending upon colloidal properties of starch, e. g., applications in which they are used as carriers, adhesives, sizes and the like.

There are various types of enzymes which act upon starch and starch products. The two principal types of commercial importance are liquefying enzymes, such as alpha-amylases, and the saccharifying enzymes, such as beta-amylases and alpha-glucosidases. Examples of the former class are the enzyme preparations sold under the trade-mark "Vanzyme" by Vanderbilt Company; "Rhozyme DX" by the Rohm and Haas Company; "Amyliq" and "Wallerstein W3F" by the Wallerstein Laboratories. Examples of the saccharifying enzymes are "Rhozyme T-22" and "Rhozyme S" sold by the Rohm and Haas Company; "Saccharozyme" sold by Takamini Laboratories; and "Mylase" sold by Wallerstein Laboratories. My invention contemplates the use of either or both types in the enzymic conversion phase. Thus, for the production of paper coatings or cold water dispersible starches where a high degree of saccharification is undesirable, alpha-amylases are indicated, and for the production of sirups, saccharifying enzymes or a combination or succession of the two types is indicated.

The following examples which are intended as informative and typical only and not in a limiting sense will further illustrate the process of my invention.

*Thin-boiling starches from starch by modification with aluminum chloride*

Example 1.—Corn starch from the second American filters in the wet milling of corn was slurried in condensate water (from boilers and process evaporators) at a concentration corresponding to 20° Bé (corrected to 60° F.). The pH value of the slurry at this point was about 4.1. A water solution of aluminum chloride was then added with stirring so that the mixture contained 2 lbs. of $AlCl_3 \cdot 6H_2O$ for every 1000 lbs. of starch, dry substance. The pH value of the slurry was then 3.0. The slurry was filtered on a continuous suction filter, reducing the moisture content to 44–46 percent.

The cake discharge from the filter was passed over a breaker to reduce the cake particle size and the broken cake was dropped onto an endless belt which carried the moist cake through a series of heated chambers, and then into a cooling chamber. During passage, the moisture content of the starch was reduced to about 10 percent in 30 to 45 minutes total time. The starch was finally passed into a neutralizing and blending chamber where, by the introduction of gaseous ammonia, the pH value of the starch was adjusted instantaneously to about 5 to 6.

A filter of the Oliver type was used to supply the cake to a belt drier of the Proctor-Schwartz type (Model K 3514).

It was found advantageous to limit the thickness of the filter cake to 0.25 to 0.50 inch and to break these sheets into pieces about 1 by 2 inches.

The drier consisted of six sections with forced draft through each. The air temperature in the sections was limited as follows:

Section 1, 120° F. (Starch temperature about 100° F.)
Section 2, 150° F.
Section 3, 200–215° F.
Section 4, 225–235° F.
Section 5, 235–245° F.
Section 6, 245–255° F. (Starch temperature about 180° F.)

Air was passed through the drier at the rate of 14,700 cu. ft. per minute. Tests at the inlet, i. e., to Section 1 and at the exhaust, i. e., from Section 6 showed:

| | Inlet | Exhaust |
|---|---|---|
| Dry bulb temperature _____ °F__ | 81 | 154 |
| Wet bulb temperature _____ °F__ | 71 | 117 |
| Relative humidity _____ percent__ | 62 | 33 |
| Lbs. water per lb. air _____ | 0.014 | 0.056 |

An additional section of the drier provided cooling by forcing air at room temperature through the starch. The drying and cooling cycle, determined by the speed of the belt, was 41 minutes. The length of the belt was 87 ft.

Under these conditions, it was found that when delivery of cake from the filter was regulated so as to lay a 2 inch bed of broken cake at 45 percent moisture on the drier belt, the starch emerged at 10.5 percent moisture. The fluidity value of the starch so treated was 50.

Example 2.—When the delivery of the starch (as in Example 1) from the filter to the drier was reduced so that a bed of cake 1¾ inches in depth was deposited, the final moisture in the starch was 8 percent and the fluidity value was 65.

Example 3.—When 0.4 percent $AlCl_3 \cdot 6H_2O$, based upon the dry weight of the starch, was added to the starch slurry which had a pH value of 2.9, a 2 inch bed of cake at 45 percent moisture deposited on the belt and passed in 30 minutes through the chambers, the air temperatures of which were:

Section 1, 135° F. (Starch temperature about 100° F.)
Section 2, 230° F.
Section 3, 250° F.
Section 4, 260° F.
Section 5, 270° F.
Section 6, 280° F. (Starch temperature about 200° F.)

the starch after cooling emerged at 10 percent moisture content and had a fluidity value of 90.

Example 4.—When 0.2 percent $AlCl_3 \cdot 6H_2O$, based upon the dry weight of the starch, was added to the starch slurry and a 1 inch bed of cake at 45 percent moisture was deposited on the belt moving through chambers, as in Example 3, the product emerged at 5–6 percent moisture and gave a fluidity value of 80.

*Dextrins from starch by modification with aluminum chloride*

Example 5.—Starch resulting from treatment as specified in Example 1, except that the starch was not neutralized, was placed in an electrically heated chamber equipped with means for efficient agitation and the temperature of the starch raised very slowly from 90° F. over a period of 90 minutes to 220° F. One hour was consumed in raising the temperature to 194° F. and a small sample was taken, neutralized with ammonia and inspected. Its paste viscosity was entirely too high to be considered as a dextrin. A sample was taken, after 75 minutes of heating, when the temperature had reached 212° F. The product now had a moisture content of 6.5 percent, contained 27.9 percent cold water solubles and produced a fluid paste when the product was cooked in a 25 percent concentration with water. At this point the characteristics of the treated starch were such as to make it suitable for use as a gum in clay coating paper. When the temperature had reached 220° F., at the end of another 15 minutes of heating, the paste consistency of the dextrin was reduced to such an extent that it was suitable for use as a seam and box lining glue, with the added advantage that it did not increase in viscosity on standing.

Apparently the dextrinization proceeds rather slowly at temperatures below 194° F. and, thereafter, proceeds rapidly.

The process for dextrinization may be made continuous by using a chamber preheated to 220° F. and of proper design for moving the starch from one end to the other over a 15 minute period.

*Cold water dispersible roll-treated products involving modification of starch by aluminum chloride*

*Example 6.*—Corn starch, as in Example 1, was made up to 20° Bé. slurry in water and 0.075 percent AlCl₃·6H₂O, based on the dry weight of the starch, was added. The pH value of the slurry was about 3.4. After filtration, the cake containing 45 percent moisture was fed to the valley between a set of heated double rolls, 30 inches in diameter, operating at 5 R. P. M. and heated with 160 lbs. steam pressure. The resulting gelatinized, modified, and dried product was cooled, ground, and bolted. It was completely dispersible in cold water, contained 20 to 35 percent cold water soluble material and possessed excellent colloidal properties for retention of water in and maintaining the viscosity of oil well drilling muds.

*Example 7.*—Corn starch, as in Example 1, was made up to 23° Bé. concentration in water and 0.125 percent AlCl₃·6H₂O, based on the dry weight of the starch, was added. This slurry (pH value of 3.4) was fed directly to heated rolls (as in Example 6), operated at 8 R. P. M. The product from the rolls was cooled, ground, bolted, and adjusted to a pH value of 6 by exposure to ammonia.

This product, which contained 70–85 percent cold water soluble material, exhibited excellent sizing properties.

*Example 8.*—Corn starch, as in Example 1, was made up to 23° Bé. concentration in water and 0.3 percent AlCl₃·6H₂O, based upon the dry weight of the starch, was added. This slurry (pH value of 3.2) was fed to rolls, as in Example 7. The product, thoroughly and quickly cooled to 80° F. or below as it left the rolls, was ground, bolted and adjusted to a pH value of 5 to 6 by exposure to ammonia.

This product was 98–100 percent cold water soluble. It mixed readily with an equal weight of water to form a fluid glue, the consistency of which remained practically constant for extended periods of time when precaution was taken against evaporation and possible microbiological action.

*Treatment of starches other than corn starch with aluminum chloride*

*Example 9.*—Slurries of tapioca, rice, corn, and potato starches were made, using, by weight, 100 parts of starch and 163 parts of water. To each was added 0.2 percent AlCl₃·6H₂O, based upon the dry weight of the starch, and the pH value of each slurry adjusted to 3.1 with hydrochloric acid. The slurries were filtered by suction to the moisture contents shown in the table below and the cakes were broken into squares about 1 inch by 1 inch and ¼ inch thick. The starches were dried simultaneously on a belt drier operating as described in Example 3. Substantially simultaneous drying of the various starches was accomplished by erecting partitions transversely across the drier belt. The depth of starch placed on the belt was adjusted for each starch according to the well-known variation in the ease of drying these types of starches when given temperatures and vapor pressures are used. For example, potato starch dries with more difficulty than corn starch, so much so, that approximately twice as thick a layer of broken cake was used in the case of corn starch as was used in the case of potato starch. The starches were dried to the moisture contents shown, then ground and adjusted to a pH value of 6 with ammonia. The results were as follows:

TABLE XI

| | Moisture of wet cake, percent | Moisture of dried starch percent | Fluidity of paste |
|---|---|---|---|
| Potato starch | 43.7 | 4.40 | 6.5 |
| Rice starch | 45.1 | 5.78 | 15.0 |
| Corn starch | 45.5 | 6.64 | 66.0 |
| Tapioca starch | 47.7 | 5.02 | 77.0 |

The process of the present invention may be carried out by means of any of the common types of equipment commercially available for making thin boiling starches, pyrodextrins and pregelatinized starches. The process is simple, economical, and the time required to produce the desired products is considerably less than that required to produce the formerly known thin boiling starches, pyrodextrins, pregelatinized starches and the like.

The principles of the present invention are applicable to various starches, e. g., corn, wheat, rice, tapioca, potato, grain sorghum and the like, either in raw or gelatinized state.

*Enzyme modification of aluminum chloride treated starch*

*Example 10.*—Double washed corn starch was made into a slurry with water at a density of approximately 20° Bé. and 2.5 lbs. of aluminum chloride hexahydrate was added for every 1000 lbs. of starch. The pH of the slurry at this point was within the range from 2.8 to 3.4. After stirring to insure intimate mixture of starch and reagent, the slurry was filtered. The filter cake, containing approximately 45 percent moisture, was broken up and then heat-treated by passage on an endless belt through a heated tunnel wherein air temperatures progressively increased from 55° C. to 135° C. During this heating cycle, which requires about 30–45 minutes, the moisture content of the starch decreased to about 10–15 percent and the actual starch temperature rose concomitantly from about 50° C. to about 80° C. Under these conditions the starch did not gelatinize and the granules upon visual inspection appeared to be no different than untreated starch.

A high density machine coating for paper was prepared from the treated starch as follows: As the starch left the belt of the continuous heat-treating chamber, about 1–2 lbs. of calcium carbonate per 1000 lbs. of starch was added along with sufficient ammonia to bring the pH up to about 6.8 to 7.2, the preferred range for the liquefying enzyme "Vanzyme" which was to be used for the enzyme modification step.

Sixty-six pounds (dry basis) of the starch mixture thus prepared was slurried together with 484 lbs. (dry basis) of clay (Georgia Kaolin Company #282 grade), 1.5 lbs. of tetrasodium pyrophosphate, 6.2 lbs. of sodium silicate solution (sp. gr. 1.39) in a total of 450 lbs. of water (including the moisture carried by the clay and starch). The mixture was stirred and the pH adjusted to approximately 7.2 to 7.5. The 2 lbs. of "Vanzyme" was added to the mixture. With efficient agitation, the temperature of the reaction mixture was raised to 76–78° C. in about 10–15 minutes and held at this temperature for 30 minutes. The temperature was then raised to 95° C. and held at this temperature for 10 minutes. The coating composition was then cooled with agitation, screened, and pumped to supply tanks for the rolls of the paper coating machine.

The above example for the preparation of coatings at a total solids concentration of 55 percent and a starch to clay ratio of 13.6 to 100 is given to permit quantitative comparison with coating mixtures of similar composition prepared by orthodox procedures.

When ordinarily used, corn starch is mixed with clay, tetrasodium pyrophosphate, silicate, enzyme, calcium carbonate, and water in the same proportions as used above and heated to bring about enzymic conversion of the starch, as the temperature reaches the range of 60°–70° C., the mass first becomes very viscous, then semiplastic and almost impossible to stir, with the result that the mixture cannot be uniformly heated to the range of temperature required for conversion and an attempt to do so leads to a very non-uniform hydrolysis of the starch. At the end of the heating period, the mass is still of relatively high viscosity and the adhesive value of the starch low.

Table XII below shows the differences in viscosity between a coating prepared by the method of Example 10 with the treated starch and one prepared by ordinary methods. The coatings were prepared in specially designed equipment. The converter was securely held in place and was provided with a wide-blade, perforated stirrer actuated by a greatly oversize "constant speed" motor. An ammeter was placed in the line to the motor and this instrument gave a reading of 22 units as the load on the motor in all cases when only starch, clay, water and adjuncts were present and before the application of heat.

TABLE XII

*Comparison of relative viscosities of clay coatings*

|  | Viscosities | |
| --- | --- | --- |
|  | As indicated by peak load on stirring motor during heating, amps. +30 | Final coating as measured by Brookfield viscometer at 40° C. 60 RPM cp. |
| Coating made in Example 10 | 23 | 340 |
| Coating made by ordinary procedures | 34 | 770 |

It may be seen from Table XII that the load on the motor only increased one unit, even at peak viscosity, when preparing a coating according to my new process, whereas the increase was 12 units when using untreated starch.

The final coating viscosity of the preparation from ordinary starch of 770 centipoises, as shown above, is not in itself a limiting factor. Indeed, coatings which have viscosities as high as 1000 centipoises, as measured under conditions outlined above, could be used with special metering and transfer rolls. However, if one attempts to go into a higher solids range by conventional procedures, e. g., 60 percent solids using the formulation of Example 10 but employing ordinarily used corn starch, the mass becomes altogether impossible to agitate at an early stage in the heating and if allowed to stand at this point over extended periods of time until the mass becomes fluid, coatings of viscosity of the order of 1000 to 1500 centipoises result, but these are unsatisfactorily weak when applied to paper and are too easily "picked" from the paper during printing due to the tacky nature of the inks. Moreover, the coated paper shows a pronounced tendency to dust when it is calendered.

*Example 11.*—The procedure of Example 10 was repeated except that 80 lbs. less water was used in the preparation of the coating (enzyme conversion step), so that the final coating contained 63 percent dry substance. The maximum reading on the ammeter during heating was 24. The final viscosity of the coating, measured under conditions indicated in Table XII, was 1030. The coating proved to be exceptionally strong and showed all of the advantages in this respect of an increase in adhesive strength for a given ratio of starch to clay simply by going to a higher solids content in the final coating mixture.

It was found possible, in accordance with the method of Example 10, to limit the amount of water in the coating formulation to the extent that a coating containing 68 percent solids resulted, and at the same time the power load on the stirrer at no time exceeded a reading of 37 on the ammeter scale.

*Example 12.*—The initial steps of the process given in Example 10 were repeated continuing through the AlCl$_3$-treatment of the starch and adjustment of pH with ammonia. At this point a slurry was made of the starch consisting of 66 lbs., dry basis starch, 0.066 lb. of calcium chloride and a total of 155 lbs. of water. The pH was 6.8. Then 1 lb. of "Vanzyme" was added and the mixture was brought up to 76° C. slowly over a period of 30 minutes. The conversion mixture was held at this temperature for 45 minutes at which time it was quite fluid. The temperature was then raised to 95° C. in about 10 minutes and held at this temperature an additional 15 minutes. Then without cooling it was added with stirring to a clay slip consisting of 484 lbs., dry basis of HT-clay, 1.5 lb. of tetrasodium pyrophosphate and a total of 230 lbs. of water. The combined mixture was agitated in a high speed mixer for 30 minutes.

The resulting coating, containing 59 percent dry solids was found to be relatively fluid at all stages of preparation and was quite suitable for transfer by roll equipment to the sheet of paper on a conventional paper machine. Furthermore, it was found that the enzyme conversion stage, using only 2.4 parts of water to one part of starch, was mobile at all times and did not require excessive power to agitate; the process could be operated in conventional equipment. The enzyme converted starch had a Dudley viscosity of 60 seconds at 90° C. and the final coating, a Brookfield viscosity of 450 centipoises at 40° C. and 60 R. P. M.

*Aluminum chloride treatment followed by enzymic saccharification*

*Example 13.*—The starch from Example 10, after the preliminary treatment consisting of drying with aluminum chloride hexahydrate, was used for enzymic saccharification, and for comparison, an untreated corn starch was also used. Duplicate conversions were made on mashes containing 20 percent corn starch solids and at the relatively high level of 40 percent corn starch solids.

All mashes were made by the addition of 0.2 percent enzyme (Wallerstein W3F) to starch slurries in water at pH 6.8. The temperature was raised to 71° C. in 90 minutes to gelatinize and thin the starch. Another 0.2 percent enzyme was then added and the temperature increased to 75° C. in 30 minutes and then to 80° C. in an additional 30 minutes to complete liquefaction. The mashes were then heated to 90° C. for 1 hour for dispersal of the starch substance. The liquors were then cooled, and at 75° C. another 0.2 percent enzyme was added and allowed to react for 60 minutes.

At 55° C., 1 percent (based on starch) of a potent saccharifying enzyme preparation (Rhozyme T-22) was added at pH 5.6 to 5.7 and saccharification completed in 22 hours. The conversions were then filtered and the yield of saccharified liquor determined. These values are shown in Table XIII together with the analysis of the liquors for total fermentables content (based on the dry solids in the liquors) and the breakdown of these fermentables into glucose and maltose.

TABLE XIII

*Comparison of aluminum chloride treated starch with untreated starch on saccharification at low and high starch concentration*

| Product | 20% Starch solids | | 40% Starch solids | |
| --- | --- | --- | --- | --- |
| | Untreated | Treated with AlCl$_3$·6H$_2$O | Untreated | Treated with AlCl$_3$·6H$_2$O |
| Yield of liquor from starch | 88 | 95 | 53 | 83 |
| Total fermentables (calculated, d. b. liquor) | 71 | 70 | 70 | 68 |
| Maltose, by test | 59 | 55 | 51 | 52 |
| Glucose, by test | 12 | 15 | 19 | 16 |

From the above Table XIII it will be seen that while the treated starch has a small advantage at the lower mash concentration, this advantage becomes very considerable at high mash concentration. At 40 percent starch solids, untreated corn starch gives a very unsatisfactory yield of only 53 percent, whereas the starch treated with aluminum chloride hexahydrate gives a 57 percent greater yield, 83 percent, or a yield which is substantially normal for untreated starch at low solids concentration. The converted syrups are comparable in all cases with respect to maltose and glucose content and calculated total fermentables.

The unsatisfactory yield in the case of the normal corn starch experiment at 40 percent starch solids is due to the fact that during the enzymic conversion, a thick, pasty mass developed which could not be sufficiently dispersed to permit attack by the enzyme. On the other hand, with starch pretreated with aluminum chloride hexahydrate, the starch liquefied readily even at 40 percent solids concentration, enabling enzymic conversion to proceed uniformly.

*Aluminum chloride treatment followed by enzymic modification and roll drying*

Example 14.—A roll dried, cold water dispersible starch was made using a starch pretreated with aluminum chloride hexahydrate as in Example 10. The process was operated for 24 hours production. A description of a similar run using untreated corn starch is given for comparison. Intrinsic viscosity values, referred to hereinafter, were determined in accordance with the procedure of Kooi, Lansky, and Schoch, J. A. C. S. 71, 4066 (1949).

In one run normally untreated corn starch was made up to a slurry of 21.5° Bé. with water, a liquefying enzyme (Rhozyme DX) added, and the slurry fed to a "Votator" at the rate of approximately 2 gallons per minute. This step gelatinized the starch at about 180° to 190° F. and allowed some enzymatic liquefaction. The starch then passed to a heated holding coil wherein the enzyme was allowed to act on the starch for 45 minutes. The starch then passed to roll driers. This product, which was converted to an intrinsic viscosity in N potassium hydroxide at 35° C. of 0.15 to 0.30, dispersed in cold water to form a dispersion suitable for use as a laundry size. Using normal untreated starch, tremendous paste viscosity developed in the "Votator" and in parts of the holding coil so that very high pump pressures, of the order of 50 to 70 lbs. per square inch, were required. Nevertheless, operation was still erratic, and certain parts of the line choked up. It was found that 0.5 percent to 0.6 percent (based on starch) of the enzyme was required to convert the untreated starch to the degree necessary to obtain a cold water dispersible product after roll drying.

In a similar continuous run using the aluminum chloride pretreated starch of Example 10 much lower pump pressure, at no time exceeding 10 lbs. per square inch, was required at the same flow rate and slurry concentration, i. e. 2 gallons per minute of 21.5° Bé. starch slurry. Moreover, an enzyme addition of only 0.4 percent (Rhozyme DX) was found sufficient to convert the starch to a comparable product completely dispersible in cold water after the roll drying operation and having an intrinsic viscosity in N potassium hydroxide of 0.15. The reduction in enzyme requirements was due to the more efficient operation resulting from the lowered paste viscosity of the reaction mixture, which inspection showed to be a free-flowing, clear, well-gelatinized mass.

This application is a continuation-in-part of U. S. Serial No. 634,890, filed December 13, 1945, issued April 4, 1950, Patent No. 2,503,053.

I claim:

1. Process for treating starch comprising modifying starch with aluminum chloride hexahydrate at a pH value within the range of about 2.8 to about 3.4, and then subjecting the modified starch to treatment with an enzyme at a pH value within the range of about 5.5 to about 7.5.

2. Process for treating starch comprising contacting starch with aluminum chloride hexahydrate at starch temperatures between about 20° C. and 105° C., said aluminum chloride hexahydrate ranging in amount from about 0.05 percent to about 0.5 percent based upon the dry weight of the starch, said starch undergoing modification containing moisture ranging in amount from 1-2 percent to about 20 percent of the total weight of the starch and moisture, the pH value of said starch undergoing modification ranging from about 2.8 to about 3.4; then subjecting the starch thus treated with aluminum chloride hexahydrate to treatment with enzyme at a pH value within the range of about 5.5 to about 7.5 and at a temperature appropriate for the enzyme used.

3. Process according to claim 2, wherein the modification of the starch with aluminum chloride hexahydrate is arrested prior to the enzyme treatment by treating the modified starch with an alkaline agent in amount to adjust the pH value to about 5.5 to about 7.5.

4. Process according to claim 2, wherein said enzyme is a liquefying enzyme.

5. Process according to claim 2, wherein said enzyme is a saccharifying enzyme.

6. Process according to claim 2, wherein first a liquefying enzyme is used and then a saccharifying enzyme.

7. Process according to claim 2, wherein the enzyme treatment of the starch takes place at starch concentrations ranging from about 40 percent to about 70 percent.

8. Process according to claim 2, wherein adjuncts for the enzyme are added to the treated starch prior to enzyme conversion.

9. Process of treating starch, which comprises contacting starch with aluminum chloride hexahydrate at starch temperatures of about 75° C. to about 95° C., said aluminum chloride hexahydrate ranging in amount from about 0.05 percent to about 0.5 percent, based upon the dry weight of the starch, said starch undergoing treatment containing moisture in the amount of about 9 percent to about 12 percent of the total weight of starch and moisture, the pH value of said starch undergoing modification ranging from about 2.8 to about 3.4, and subjecting the starch thus modified to treatment with enzyme at a pH value within the range of about 5.5 to about 7.5 and at a temperature appropriate for the enzyme used.

10. Process according to claim 9, wherein said enzyme is a liquefying enzyme.

11. Process according to claim 9, wherein said enzyme is a saccharifying enzyme.

12. Process according to claim 9, wherein the contact time during aluminum chloride hexahydrate modification is of the order of about 30 minutes.

13. The process of treating starch which comprises contacting starch with aluminum chloride hexahydrate at starch temperatures of about 90° C. to about 105° C., said aluminum chloride hexahydrate ranging in amount from about 0.05 percent to about 0.5 percent, based on the dry weight of the starch, said starch undergoing treatment containing moisture in the amount of about 5 to about 7 percent of the total weight of starch and moisture, the pH value of said starch undergoing modification ranging from about 2.8 to about 3.4, and subjecting the starch thus modified to treatment with an enzyme at a pH value within the range of about 5.5 to about 7.5 and at a temperature appropriate for the enzyme used.

14. Process according to claim 13, wherein the contact time during aluminum chloride hexahydrate modification is of the order of about 15 to 30 minutes.

15. The process of treating starch contained in mixtures of starch and moisture wherein the weight of moisture exceeds 30 percent of the total weight of starch and moisture, which comprises reducing the moisture content of the mixture to between about 1 percent and about 30 percent of the total weight of starch and moisture, thereafter modifying the starch by contacting the same with aluminum chloride hexahydrate in amounts ranging from about 0.05 percent to about 0.5 percent based on the dry weight of the starch, at a starch temperature between about 20° C. and about 105° C. for a period of time to effect desired modification of the starch, the pH value of said starch undergoing modification ranging from about 2.8 to about 3.4, and subjecting the starch thus modified to treatment with enzyme at a pH value within the range of about 5.5 to about 7.5 and at a temperature appropriate for the enzyme used.

16. Process according to claim 1, wherein said starch is corn starch.

17. Process according to claim 1, wherein said starch is tapioca starch.

18. Process according to claim 1, wherein said starch is rice starch.

19. Process according to claim 9, wherein the modification of the starch with aluminum chloride hexahydrate is arrested by treating the modified starch with gaseous ammonia to adjust the pH value to about 5.5 to about 7.5 prior to enzyme treatment.

20. Process according to claim 13, wherein the modification of the starch with aluminum chloride hexahydrate is arrested prior to the enzyme treatment by adjusting the pH value to about 5.5 to about 7.5 with an alkaline agent.

21. Process according to claim 9, wherein said starch is corn starch.

22. Process according to claim 13, wherein said starch is corn starch.

23. Process of treating starch containing mixtures of starch and moisture, wherein the weight of moisture exceeds about 30 percent of the total weight of starch and moisture, which comprises contacting the starch with aluminum chloride hexahydrate in amounts ranging from about 0.05 percent to about 0.5 percent, based on the dry weight of the starch, reducing the moisture content of the mixture to between about 1 percent and about 30 percent of the total weight of the starch and moisture without effecting modification of the starch, thereafter modifying the starch by maintaining a starch temperature between about 20° and about 105° C. for a period of time sufficient to effect desired modification of the starch, the pH value of said starch undergoing modification ranging from about 2.8 to about 3.4, adjusting the pH value of the modified starch to about 5.5 to about 7.5, and subjecting the starch to treatment with enzyme.

24. Process of treating starch contained in mixtures of starch and moisture, wherein the weight of moisture exceeds about 30 percent of the total weight of starch and moisture, which comprises contacting the starch with aluminum chloride hexahydrate in amounts ranging from about 0.05 percent to about 0.5 percent, based on the dry weight of the starch, subjecting the mixture to pressure for a short interval of time between surfaces maintained at a temperature at about 180° C. while permitting free evaporation of moisture, the pH value in said starch undergoing treatment ranging from about 2.8 to about 3.4, thereafter adjusting the pH value of the modified starch to about 5.5 to about 7.5, and subjecting the modified starch to treatment with enzyme.

25. Process of treating corn starch which comprises mechanically dewatering a corn starch slurry containing about 0.2 percent of aluminum chloride hexahydrate, based upon the starch dry substance, and having a pH value of about 3.0, gradually decreasing the moisture content of the starch to about 10 percent by heat treatment within a period of about 40 minutes without gelatinizing the starch, the temperature of the starch not exceeding about 180° F. during said heat treatment, then heating the starch for about 15 minutes in a chamber preheated to and maintained at a temperature of about 220° F., adjusting the pH value of the starch to about 5.5 to about 7.5, and thereafter treating the starch with an enzyme.

26. Process of treating starch which comprises mechanically dewatering a starch slurry containing aluminum chloride hexahydrate, gradually decreasing the moisture content of the starch by heat treatment to about 5 to 7 percent without gelatinizing the starch, the temperature of the starch not exceeding about 180° F. to 200° F.; said aluminum chloride hexahydrate being present in said slurry to the extent of about 0.05 percent to 0.5 percent, based upon the starch dry substance, said slurry having a pH value of about 2.8 to about 3.4; thereafter adjusting the pH of the starch to about 5.5 to about 7.5, and treating the starch with enzyme.

27. Process of treating starch which comprises mechanically dewatering a starch slurry containing about 0.05 percent to about 0.5 percent of aluminum chloride hexahydrate, based upon the dry weight of the starch, and having a pH value of about 2.8 to about 3.4, subjecting the dewatered starch to heat treatment for about 30 to about 40 minutes to gradually decrease the moisture content of the starch to about 10 percent without gelatinizing the starch, the temperature of the starch undergoing heat treatment not exceeding about 180° F. to 200° F., thereafter adjusting the pH value of the starch to about 5.5 to about 7.5, and treating the starch with enzyme.

28. Process of treating corn starch which comprises mechanically dewatering a corn starch slurry containing about 0.4 percent of aluminum chloride hexahydrate, based on the dry weight of the starch, having a pH value of about 2.9 and a temperature of about 90° F. to 100° F., then subjecting the dewatered starch to heat treatment for about 30 minutes to gradually decrease the moisture content of the starch to about 10 percent without gelatinizing the starch, the temperature of the starch undergoing heat treatment not exceeding about 200° F., thereafter adjusting the pH value of the starch to about 5.5 to about 7.5, and treating the starch with enzyme.

29. Process according to claim 14, wherein said starch is corn starch.

30. Process acccording to claim 24, wherein said starch is corn starch.

31. Process according to claim 26, wherein said starch is corn starch.

32. Process according to claim 27, wherein said starch is corn starch.

33. Process for treating starch which comprises mechanically dewatering a starch slurry containing about 0.05 percent to about 0.5 percent of aluminum chloride hexahydrate, based on the dry weight of the starch, and having a pH value of about 2.8 to about 3.4, subjecting the dewatered starch to heat treatment for about 30 to about 45 minutes to gradually decrease the moisture content of the starch to about 10 percent without gelatinizing the starch, the temperature of the starch undergoing heat treatment not exceeding about 180° F. to 200° F., thereafter adding to the starch about 0.1 to about 0.2 percent calcium carbonate, based on the weight of the starch, and sufficient alkaline agent to bring the pH value of the starch into the range of about 6.0 to about 7.5, adding a starch liquefying enzyme to a slurry of the starch in water and converting the starch to a Dudley viscosity of about 60 seconds to about 150 seconds; the ratio of starch to water in said slurry being from about 1:2 to about 1:3.

34. Process for preparing a clay coating for paper which comprises mechanically dewatering a starch slurry containing from about 0.05 to about 0.5 percent of aluminum chloride hexahydrate, based on the dry weight of the starch, and having a pH value of about 2.8 to about 3.4, subjecting the dewatered starch to heat treatment for about 30 to about 45 minutes to gradually decrease the moisture content of the starch to about 10 percent without gelatinizing the starch, the temperature of the starch undergoing heat treatment not exceeding about 180° F. to 200° F., thereafter adding about 0.1 percent to about 0.2 percent calcium carbonate, based on the weight of the starch, and sufficient alkaline agent to bring the pH value of the starch into the range of about 6.0 to about 7.5, converting the starch, in the presence of the clay and coating adjuncts, with a starch liquefying enzyme to a Dudley viscosity of about 60 seconds to about 150 seconds.

35. Process according to claim 27, wherein said enzyme is starch liquefying enzyme and the product of the enzyme treatment is roll dried to give a cold water dispersible starch product with an intrinsic viscosity of about 0.15 to about 0.30 in N potassium hydroxide.

36. Process for preparing a starch conversion syrup which comprises mechanically dewatering a starch slurry containing from about 0.05 percent to about 0.5 percent of aluminum chloride hexahydrate, based on the dry weight of the starch, and having a pH value of about 2.8 to about 3.4, subjecting the dewatered starch to a heat treatment to gradually decrease the moisture content to about 10 percent without gelatinizing the starch, the temperature of the starch undergoing heat treatment not exceeding about 180° F. to 200° F., thereafter adjusting the pH of the starch to about 5.5 to about 7.5 and converting the starch with liquefying enzyme and saccharifying enzyme.

37. Process according to claim 36, wherein the enzyme conversion is performed using a slurry containing about 20 percent to about 40 percent starch solids.

38. Process according to claim 36, wherein said enzyme conversion is carried out to a total fermentables content of approximately 70 percent.

39. Process for preparing a starch conversion syrup which comprises mechanically dewatering a starch slurry containing from about 0.05 percent to about 0.5 percent aluminum chloride hexahydrate, based on the dry weight of the starch, and having a pH value of about 2.8 to about 3.4, subjecting the dewatered starch to heat treatment to gradually decrease the moisture content of the starch without gelatinizing the starch, the temperature of the starch undergoing heat treatment not exceeding about 180° F. to 200° F., thereafter adjusting the pH of the starch to about 6.0 to about 7.5, adding liquefying enzyme, liquefying the starch by enzyme in a slurry of about 20 percent to about 40 percent starch solids at temperatures of about 70° C. to about 80° C., cooling the slurry to about 55° C. and adjusting the pH value thereof to about 5.6 to about 5.7, adding saccharifying enzyme and allowing the same to act on the starch until saccharification has been completed to the desired extent.

40. Process for preparing a clay coating for paper, which comprises modifying starch with aluminum chloride hexahydrate at starch temperatures between about 20° C. and about 105° C., said aluminum chloride hexahydrate ranging in amount from about 0.05 percent to about 0.5 percent, based on the dry weight of the starch, said starch undergoing modification containing moisture ranging in amount from about 1 percent to about 20 percent of the total weight of the starch and moisture, the pH value of said starch undergoing modification ranging from about 2.8 to about 3.4; thereafter liquefying the treated starch by means of an enzyme in the presence of the clay and coating adjuncts.

RALPH W. KERR.

REFERENCES CITED

The following references are of record in the file of this patent:

UNITED STATES PATENTS

| Number | Name | Date |
| --- | --- | --- |
| 2,380,848 | Kerr | July 31, 1945 |
| 2,503,053 | Kerr | Apr. 4, 1950 |